(12) United States Patent
Xue et al.

(10) Patent No.: US 7,996,702 B2
(45) Date of Patent: Aug. 9, 2011

(54) SYSTEM AND METHOD FOR TESTING OVERCLOCKING CAPABILITY OF CPU

(75) Inventors: Dong-Hai Xue, Shenzhen (CN); De-Yuan Dong, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 513 days.

(21) Appl. No.: 12/261,023

(22) Filed: Oct. 29, 2008

(65) Prior Publication Data

US 2010/0070792 A1 Mar. 18, 2010

(30) Foreign Application Priority Data

Sep. 17, 2008 (CN) .......................... 2008 1 0304542

(51) Int. Cl.
*G06F 1/00* (2006.01)

(52) U.S. Cl. ............ 713/501; 713/1; 713/100; 713/400; 713/500; 713/502; 714/10; 714/23; 714/55

(58) Field of Classification Search .............. 713/1, 100, 713/400, 500, 501, 502, 600; 714/10, 23, 714/55
See application file for complete search history.

(56) References Cited

U.S. PATENT DOCUMENTS

| | | | | |
|---|---|---|---|---|
| 4,696,002 A * | 9/1987 | Schleupen et al. ............... 714/23 |
| 4,775,957 A * | 10/1988 | Yakuwa et al. .................. 714/10 |
| 5,513,319 A * | 4/1996 | Finch et al. ...................... 714/55 |
| 5,630,110 A * | 5/1997 | Mote, Jr. ......................... 713/501 |
| 5,674,422 A * | 10/1997 | Marinus ......................... 219/497 |
| 5,864,663 A * | 1/1999 | Stolan .............................. 714/55 |
| 6,230,279 B1 * | 5/2001 | Dewa et al. .................... 713/324 |
| 6,269,443 B1 * | 7/2001 | Poisner et al. ..................... 713/1 |
| 6,535,986 B1 * | 3/2003 | Rosno et al. .................... 713/400 |
| 6,963,992 B1 * | 11/2005 | Cheng et al. ................... 713/501 |
| 7,249,275 B2 * | 7/2007 | Weng et al. .................... 713/501 |
| 7,287,199 B2 * | 10/2007 | Chang ............................. 714/55 |
| 7,536,578 B2 * | 5/2009 | Pessolano ...................... 713/500 |
| 2003/0229816 A1 * | 12/2003 | Meynard ........................ 713/600 |
| 2009/0259876 A1 * | 10/2009 | Chang et al. ................... 713/501 |
| 2010/0146252 A1 * | 6/2010 | Chang et al. ....................... 713/1 |
| 2010/0315146 A1 * | 12/2010 | Yen ................................. 327/291 |

OTHER PUBLICATIONS

National Semiconductor. LM3712. Microprocessor Supervisory Circuits with Separate Watchdog Timer Output, Power Fail Input and Manual Reset. Data sheet. Jun. 9, 2008.*
Brentek International. Watchdog Application Notes. 2007.*
Sunplus Technology Co. Using Watchdog Timer. Version 1.2. Nov. 1, 2006.*

* cited by examiner

Primary Examiner — Matthew Spittle
(74) Attorney, Agent, or Firm — Zhigang Ma

(57) ABSTRACT

A test system for overclocking capability of a central processing unit (CPU) includes a basic input and output system (BIOS), a frequency generator, and a watchdog timer. The BIOS includes an input module, a watchdog control module, and a frequency increasing module. The input module inputs an initial frequency of a CPU to the frequency generator to adjust a real-time frequency of the CPU. The watchdog control module sends a counter signal to the watchdog timer in a preset time interval. The watchdog timer receives the counter signal. If the watchdog timer does not receive the counter signal within the preset time, the watchdog timer outputs a reset signal to restart the computer. The frequency increasing module adds a preset increment to the real-time frequency to obtain a newly adjusted frequency, and provides the newly adjusted frequency to the frequency generator to adjust the real-time frequency.

14 Claims, 2 Drawing Sheets

SYSTEM AND METHOD FOR TESTING OVERCLOCKING CAPABILITY OF CPU

BACKGROUND

1. Technical Field

The present invention relates to systems and methods for testing overclocking capability of a central processing unit (CPU) and, particularly, to a system and a method for testing overclocking capability of a CPU of a computer system.

2. Description of Related Art

Generally, users may initially want to know the overclocking capability of a CPU, e.g. the maximum frequency the CPU can achieve prior to implementing overclocking. However, due to different computer configurations, as well as environmental conditions, different computers have different overclocking abilities. Furthermore, the test for the overclocking capability of the CPU is usually done manually, thereby making the test inefficient and inaccurate.

Therefore, it is desired to provide a system and a method for testing overclocking capability of a CPU to overcome the above described shortcomings.

DETAILED DESCRIPTION

Figure 1:
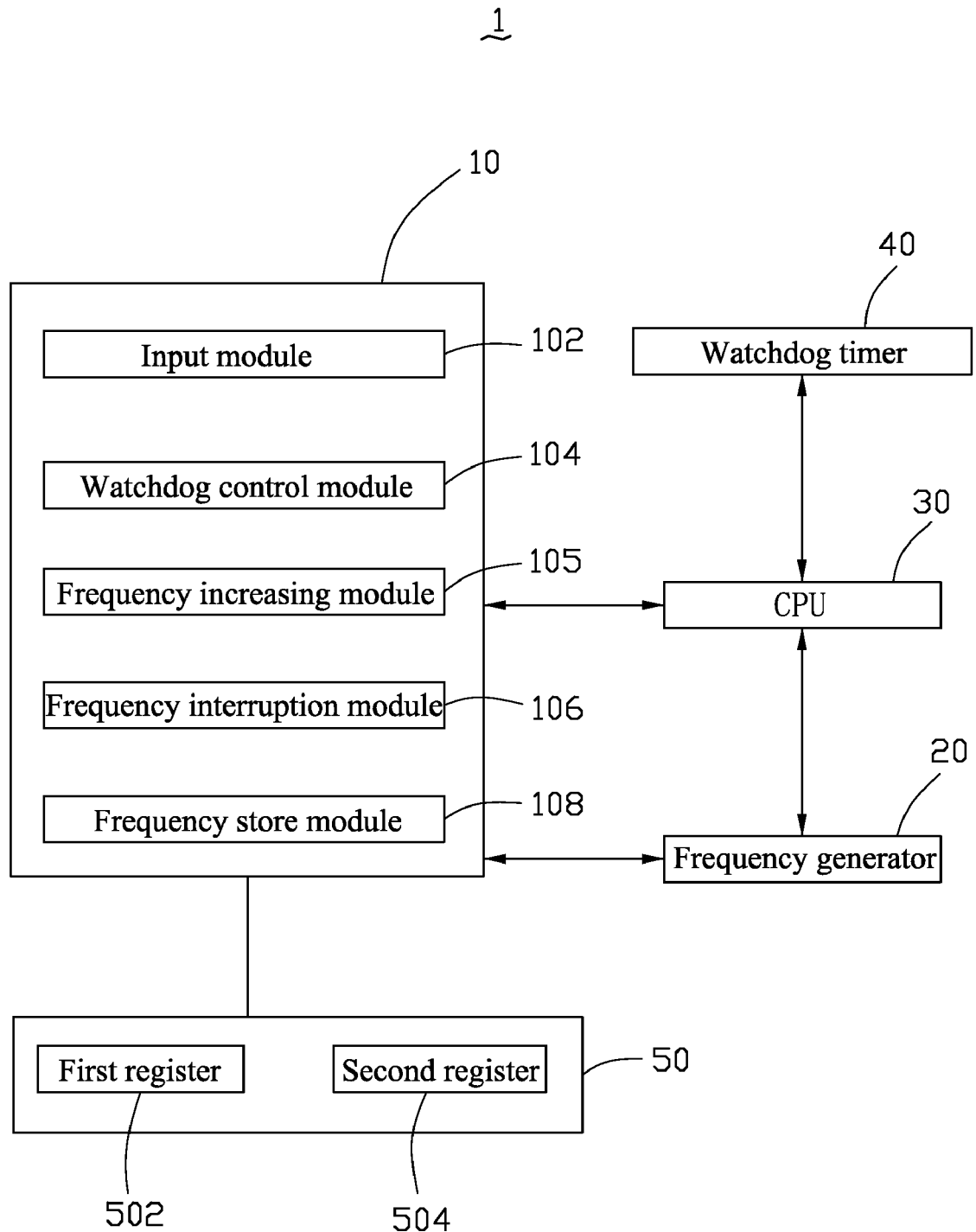
FIG. 1 is a block diagram of an exemplary embodiment of a system for testing overclocking capability of a CPU.

Referring to FIG. 1, an exemplary embodiment of a system 1 for testing overclocking capability of a CPU 30 includes a basic input and output system (BIOS) 10, a frequency generator 20, a watchdog timer 40, and a memory module, such as a complementary metal oxide semiconductor (CMOS) memory 50. The BIOS 10 includes an input module 102, a watchdog control module 104, a frequency increasing module 105, a frequency interruption module 106, and a frequency store module 108. The CMOS memory 50 includes a first register 502 and a second register 504.

The input module 102 is configured for receiving an initial frequency of the CPU 30 input by users, and for providing the initial frequency to the frequency generator 20.

The frequency generator 20 adjusts a real-time frequency of the CPU 30.

The watchdog control module 104 is configured for sending a counter signal to the watchdog timer 40 via the CPU 30 in a preset time interval. The preset time interval can be two seconds in this embodiment.

The watchdog timer 40 is configured for receiving the counter signal from the CPU 30, and is also configured for determining whether the CPU 30 reaches a maximum frequency. The CPU 30 stops working and reaches the maximum frequency if the watchdog timer 40 does not receive a next counter signal within a preset time, and as a result, the watchdog timer 40 outputs a reset signal to restart the computer. The maximum frequency may be a fixed value or a range.

After the watchdog control module 104 sends the next counter signal to the watchdog timer 40, the frequency increasing module 105 adds a preset increment to the real-time frequency of the CPU 30 to obtain a newly adjusted frequency. The frequency generator 20 adjusts the real-time frequency of the CPU 30 accordingly. The frequency increasing module 105 is also configured for controlling the real-time frequency of the CPU 30 displayed on a setup interface of the BIOS 10, and storing the real-time frequency of the CPU 30 in the first register 502.

The frequency interruption module 106 is configured for detecting whether an interruption signal is input by users. If the frequency interruption module 106 receives an interruption signal, the test for the overclocking capability of the CPU 30 stops, and the corresponding information is displayed on the setup interface of the BIOS 10 to inform users that the test for the overclocking capability of the CPU 30 has stopped. If the frequency interruption module 106 does not receive the interruption signal, the test for the overclocking capability of the CPU 30 continues.

The frequency store module 108 is configured for determining whether a frequency store signal is input by users. If the frequency store module 108 receives the frequency store signal, the frequency store module 108 stores the real-time frequency of the CPU 30 in the second register 504, and the computer exits the setup interface of the BIOS 10. If the frequency store module 108 does not receive the frequency store signal, the computer exits the setup interface of the BIOS 10. The first and the second registers are both internal registers of the CMOS memory 50.

Figure 2:
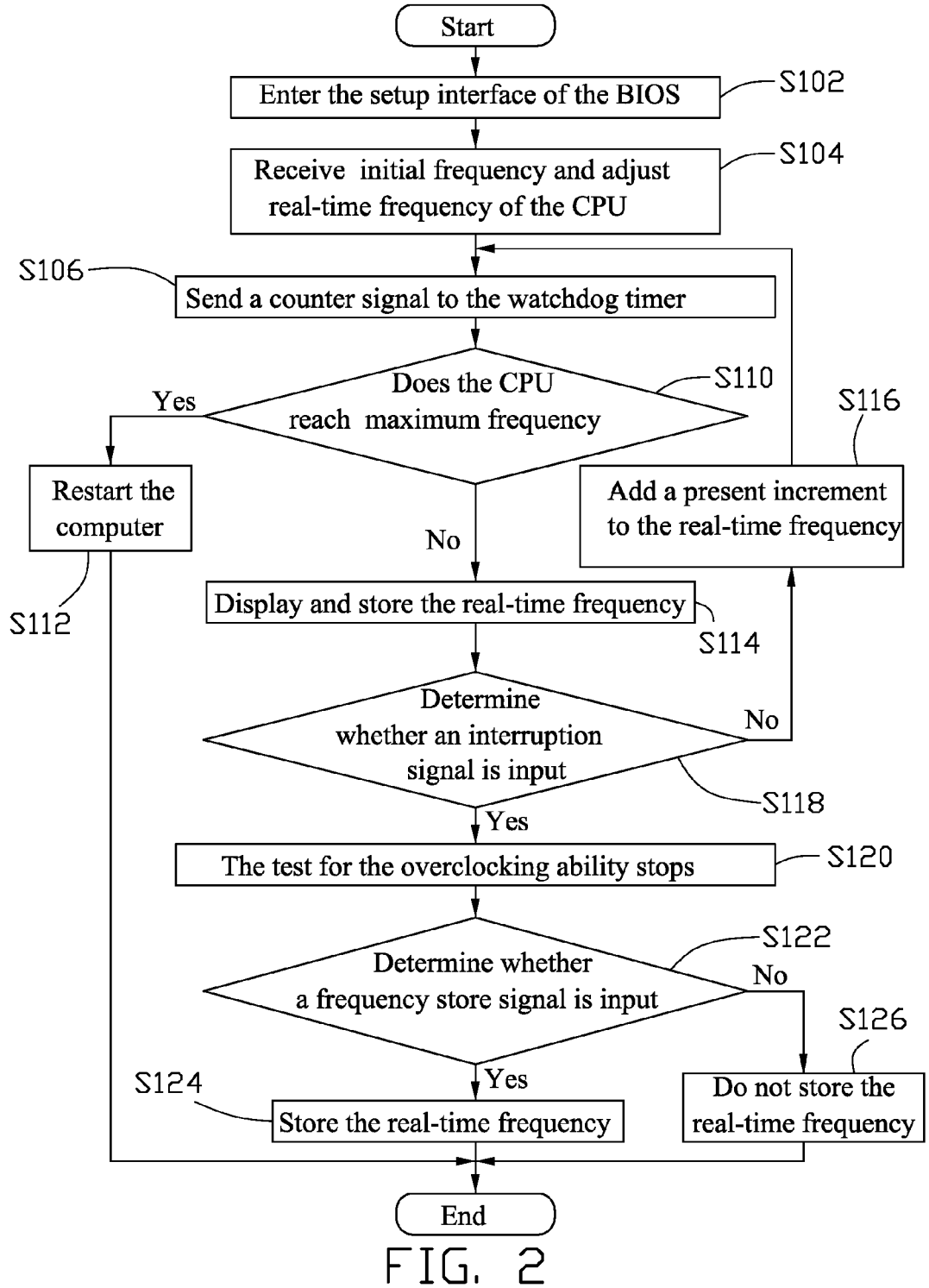
FIG. 2 is a flowchart of an exemplary embodiment of a method for testing overclocking capability of a CPU.

Referring to FIG. 2, an exemplary embodiment of a method for testing overclocking capability of a CPU includes the following steps described below.

In step S102, a key on a keyboard, such as the Delete key of the computer, is pressed, and the computer enters the setup interface of the BIOS 10.

In step S104, the input module 102 receives the initial frequency of the CPU 30 input by users, and provides the initial frequency to the frequency generator 20 to adjust the real-time frequency of the CPU 30.

In step S106, the watchdog control module 104 sends the counter signal to the watchdog timer 40 via the CPU 30.

In step S110, the watchdog timer 40 determines whether the CPU 30 reaches the maximum frequency, the CPU 30 stops working and reaches the maximum frequency if the watchdog timer 40 does not receive the counter signal within the preset time, and the procedure goes to step S112; if the watchdog timer 40 receives the next counter signal within the preset time, the procedure goes to step S114.

In step S112, the watchdog timer 40 outputs the reset signal to restart the computer.

In step S114, the frequency increasing module 105 controls the real-time frequency of the CPU 30 displayed on the setup interface of the BIOS 10, and storing the real-time frequency of the CPU 30 in the first register 502.

In step S118, the frequency interruption module 106 detects whether the frequency interruption signal is input by users, and if the frequency interruption module 106 receives the frequency interruption signal, the procedure goes to step S120. If the frequency interruption module 106 does not receive the frequency interruption signal, the procedure goes to step S116.

In step S116, the frequency increasing module 105 adds a preset increment to the real-time frequency of the CPU 30 to obtain a newly adjusted frequency; the frequency generator 20 adjusts the real-time frequency of the CPU 30, and the procedure goes to step S106.

In step S120, the test for the overclocking capability of the CPU 30 stops, and the corresponding information is displayed on the setup interface of the BIOS 10 to inform users that the test for the overclocking capability of the CPU 30 has stopped.

In step S122, the frequency store module 108 determines whether the frequency store signal is input by users, if the frequency store module 108 receives the frequency store signal, the procedure goes to step S124. If the frequency store module 108 does not receive the frequency store signal, the procedure goes to step S126.

In step S124, the frequency store module 108 stores the real-time frequency of the CPU 30 in the second register 504, and the computer exits the setup interface of the BIOS 10.

In step S126, the frequency store module 108 does not store the real-time frequency of the CPU 30 in the second register 504, and the computer exits the setup interface of the BIOS 10.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A system for testing overclocking capability of a central processing unit (CPU) of a computer, comprising:
    an frequency generator configured for generating and adjusting a real-time frequency of the CPU;
    a watchdog timer configured for receiving a counter signal in a preset time interval from the CPU; and
    a basic input and output system (BIOS) comprising:
        an input module configured for inputting an initial frequency to the frequency generator;
        a watchdog control module configured for sending a counter signal to the watchdog timer via the CPU in a preset time interval, wherein upon a condition that the watchdog timer does not receive a next counter signal within the preset time, the watchdog timer outputs a reset signal to restart the computer; and
        a frequency increasing module configured for adding a preset increment to the real-time frequency of the CPU to obtain a newly adjusted frequency, and providing the newly adjusted frequency to the frequency generator to adjust the real-time frequency of the CPU after the watchdog control module sends the next counter signal to the watchdog timer.

2. The system of claim 1, wherein the BIOS further comprises a setup interface, and the frequency increasing module is further configured for controlling the real-time frequency of the CPU displayed on the setup interface and storage of the real-time frequency.

3. The system of claim 1, wherein the BIOS further comprises a frequency interruption module configured for receiving an interruption signal input by users, upon a condition that the frequency interruption module receives the interruption signal, the test for the overclocking capability of the CPU stops.

4. The system of claim 2, wherein the system further comprises a memory module, and the BIOS further comprises a frequency store module configured for receiving a frequency store signal input by users, upon a condition that the frequency store module receives the frequency store signal, the frequency store module stores the real-time frequency of the CPU in the memory module.

5. The system of claim 4, wherein the memory module comprises a complementary metal oxide semiconductor (CMOS) memory.

6. The system of claim 5, wherein the memory module comprises at least one register for storing a real-time frequency of the CPU.

7. The system of claim 5, wherein the at least one register comprises two internal registers, namely, a first register for a storing real-time frequency by the frequency increasing module, and a second register for storing a real-time frequency by the frequency interruption module.

8. A method for testing overclocking capability of a central processing unit (CPU) of a computer, comprising:
    entering a setup interface of a basic input and output system (BIOS) of the computer;
    inputting an initial frequency, and sending the initial frequency to a frequency generator to adjust a real-time frequency of the CPU;
    sending a counter signal to a watchdog timer via the CPU;
    outputting a reset signal to restart the computer, upon a condition that the watchdog timer does not receive the counter signal within a preset time;
    upon a condition that the watchdog timer receives the counter signal within the preset time, storing the real-time frequency in a first register; and
    increasing the stored frequency, and sending the increased frequency to the frequency generator, the frequency generator adjusts the real-time frequency of the CPU, the procedure returns to the step of sending a counter signal.

9. The method of claim 8, further comprising: displaying the real-time frequency of the CPU on a setup interface of the BIOS.

10. The method of claim 8, wherein the first register is an internal register of a complementary metal oxide semiconductor (CMOS) memory.

11. The method of claim 8, further comprising: determining whether a frequency interruption signal has been input by users, upon a condition that the frequency interruption signal is received, the test for the overclocking capability of the CPU stops.

12. The method of claim 11, further comprising: displaying the information of receiving the frequency interruption signal on the setup interface of the BIOS.

13. The method of claim 11, further comprising: determining whether a frequency store signal has been input by users, upon a condition that receiving the frequency store signal, storing the real-time frequency of the CPU in a second register.

14. The method of claim 13, wherein the second register is an internal register of a CMOS memory.

* * * * *